US010706742B2

(12) United States Patent
Stump

(10) Patent No.: US 10,706,742 B2
(45) Date of Patent: Jul. 7, 2020

(54) METHOD AND SYSTEM FOR CREATING A SYNTHETIC PULSE

(71) Applicant: Texas Tech University System, Lubbock, TX (US)

(72) Inventor: Robert F. Stump, El Paso, TX (US)

(73) Assignee: Texas Tech University System, Lubbock, TX (US)

(*) Notice: Subject to any disclaimer, the term of this patent is extended or adjusted under 35 U.S.C. 154(b) by 282 days.

(21) Appl. No.: 15/872,103

(22) Filed: Jan. 16, 2018

(65) Prior Publication Data

US 2018/0218645 A1 Aug. 2, 2018

Related U.S. Application Data

(60) Provisional application No. 62/451,127, filed on Jan. 27, 2017, provisional application No. 62/447,203, filed on Jan. 17, 2017.

(51) Int. Cl.
| | |
|---|---|
| *A63F 9/24* | (2006.01) |
| *G09B 23/28* | (2006.01) |
| *G09B 5/00* | (2006.01) |
| *G09B 9/00* | (2006.01) |
| *G09B 23/30* | (2006.01) |

(52) U.S. Cl.
CPC .............. *G09B 23/28* (2013.01); *G09B 5/00* (2013.01); *G09B 9/00* (2013.01); *G09B 23/30* (2013.01)

(58) Field of Classification Search
CPC .......... G09B 23/28; G09B 23/30; G09B 5/00; G09B 9/00; G09B 5/065
See application file for complete search history.

(56) References Cited

U.S. PATENT DOCUMENTS

| | | | | |
|---|---|---|---|---|
| 3,469,115 | A * | 9/1969 | Partridge | H03K 3/26 327/131 |
| 5,482,472 | A * | 1/1996 | Garoni | G09B 23/30 345/83 |
| 6,007,342 | A * | 12/1999 | Tjølsen | G09B 23/288 434/265 |
| 7,510,398 | B1 * | 3/2009 | Thornton | G09B 23/288 434/262 |
| 8,287,283 | B2 | 10/2012 | Lecat | |
| 2004/0157199 | A1 * | 8/2004 | Eggert | G09B 23/28 434/262 |
| 2005/0048485 | A1 | 3/2005 | Hayarnizu et al. | |
| 2005/0131307 | A1 | 6/2005 | Ruiter et al. | |
| 2008/0027694 | A1 * | 1/2008 | Gitman | A61B 5/04021 703/11 |
| 2008/0118901 | A1 | 5/2008 | Morris | |
| 2008/0138778 | A1 | 6/2008 | Eggert et al. | |
| 2008/0138780 | A1 | 6/2008 | Eggert et al. | |
| 2010/0062407 | A1 * | 3/2010 | Lecat | G09B 23/34 434/262 |
| 2010/0316984 | A1 * | 12/2010 | Rosenthal | A61B 5/02 434/268 |

(Continued)

*Primary Examiner* — Steve Rowland

(74) *Attorney, Agent, or Firm* — Loza & Loza LLP; Kevin L. Soules

(57) ABSTRACT

A pulse simulation device comprises a controller for generating at least one signal simulating a pulse, at least one tactile feedback unit wherein the tactile feedback unit is driven by the controller to generate tactile response simulating a pulse, and a wearable attachment for holding the tactile feedback on an actor.

17 Claims, 6 Drawing Sheets

(56) References Cited

U.S. PATENT DOCUMENTS

| | | | |
|---|---|---|---|
| 2011/0207102 A1* | 8/2011 | Trotta | G09B 23/28 |
| | | | 434/267 |
| 2011/0311956 A1 | 12/2011 | Eggert et al. | |
| 2012/0288837 A1* | 11/2012 | Eikefjord | G09B 23/28 |
| | | | 434/262 |
| 2013/0330699 A1 | 12/2013 | Eggert et al. | |
| 2017/0193858 A1* | 7/2017 | Segall | G09B 23/303 |
| 2018/0158376 A1* | 6/2018 | Tessier | A61B 5/107 |

* cited by examiner

METHOD AND SYSTEM FOR CREATING A SYNTHETIC PULSE

CROSS REFERENCE TO RELATED PATENT APPLICATIONS

This patent application claims the priority and benefit, under 35 U.S.C. § 119(e), of U.S. Provisional Patent Application Ser. No. 62/447,203, filed Jan. 17, 2017, entitled "METHOD AND SYSTEM FOR CREATING A SYNTHETIC PULSE." U.S. Provisional Patent Application Ser. No. 62/447,203 is herein incorporated by reference in its entirety.

This patent application also claims the priority and benefit, under 35 U.S.C. § 119(e), of U.S. Provisional Patent Application Ser. No. 62/451,127, filed Jan. 27, 2017, entitled "METHOD AND SYSTEM FOR CREATING A SYNTHETIC PULSE." U.S.

Provisional Patent Application Ser. No. 62/451,127 is herein incorporated by reference in its entirety.

TECHNICAL FIELD

Embodiments are generally related to the field of medical simulations. Embodiments are further related to the field of medical or veterinary training. Embodiments are also related to methods, systems, and devices for simulating a pulse. Embodiments are further related to methods, systems, and devices for simulating a pulse on an actor or mannequin during medical simulations. Embodiments are further related to methods, systems, and devices for simulating a pulse on an animal during veterinary simulations.

BACKGROUND

Training for medical or veterinary personnel is an important aspect of developing the diagnostic and treatment skills necessary for providing care. Using human or animal actors for such training can be vital. However, the actual, physical symptoms associated with a given condition can be difficult to simulate on a healthy human actor. One such example is the unusual pulse rate and pattern experienced as a result of a number of medical conditions. An actor is generally not capable of reproducing specific pulse characteristics. Mannequins can be equipped with systems to mimic certain vital signs, but cannot realistically provide the emotional aspects of the scenario that make the training compelling.

Certain prior art methods for simulating a pulse exist. However, these methods are focused on providing "sound" devices, "auscultation" devices, or "auditory" devices. No attempt is made to mask frequencies within the human hearing range. Such devices fail to present a user with a synthetic pulse that provides the correct timing, rate, amplitude, pattern, and/or feel that a patient might actually experience during a medical episode.

Accordingly, there is a need in the art for systems and methods that provide a synthetic pulse that simulates the pulse experienced by a patient with a particular condition.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method, system, and apparatus for simulating a pulse.

It is another aspect of the disclosed embodiments to provide a method, system, and apparatus for providing a synthetic pulse that simulates the pulse of a patient with a specific medical condition.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
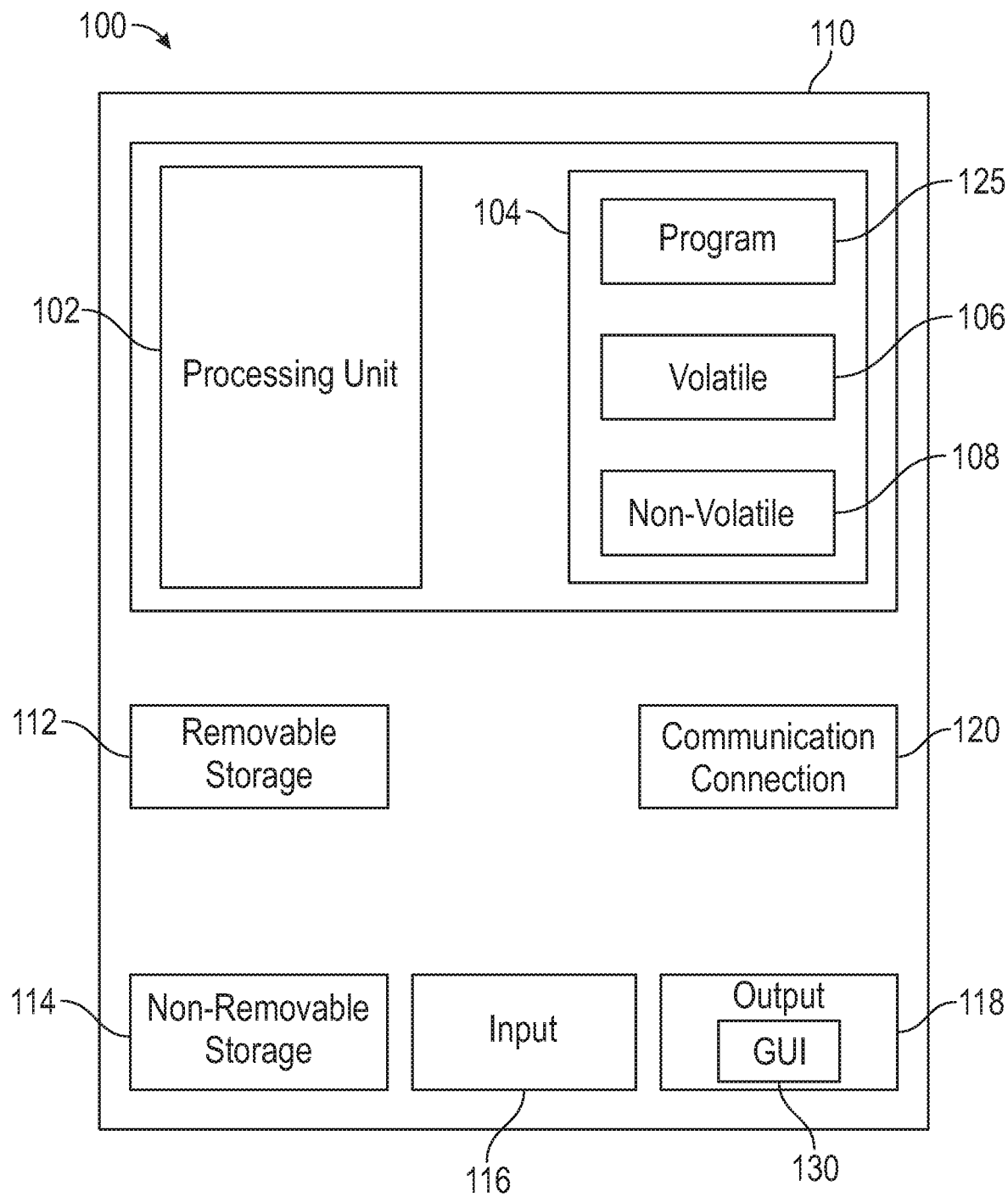
FIG. 1 depicts a block diagram of a computer system which is implemented in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements, or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those skilled in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Figure 2:
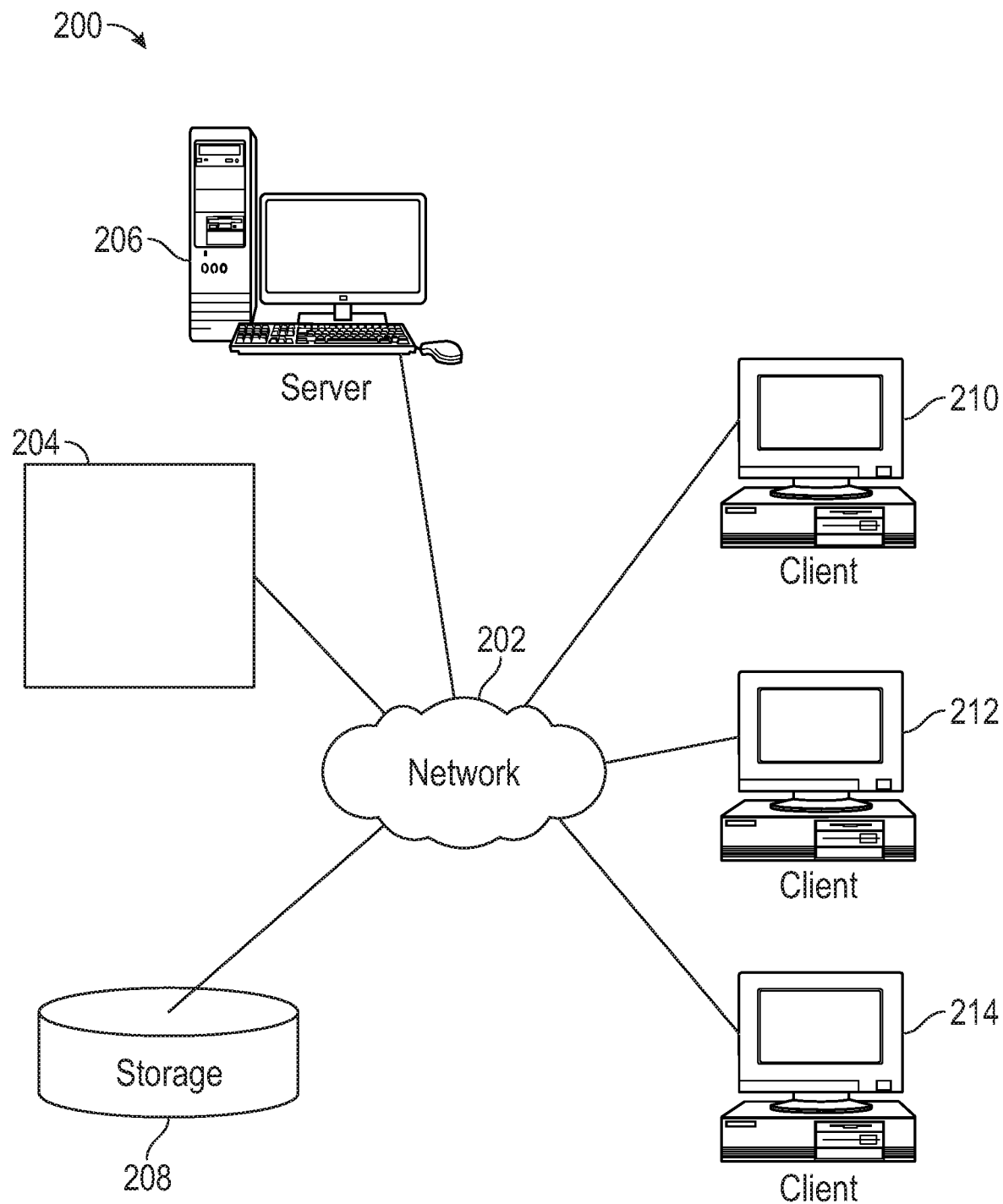
FIG. 2 depicts a graphical representation of a network of data-processing devices in which aspects of the present embodiments may be implemented.
Figure 3:
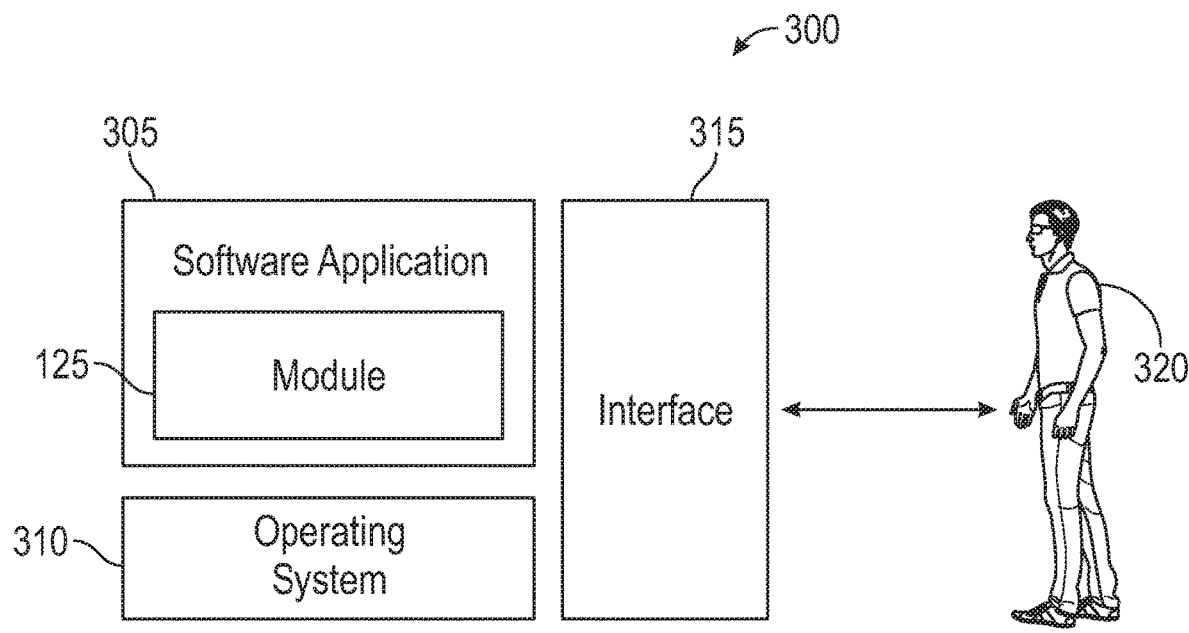
FIG. 3 depicts a computer software system for directing the operation of the data-processing system depicted in FIG. 1, in accordance with an example embodiment.
Figure 4:
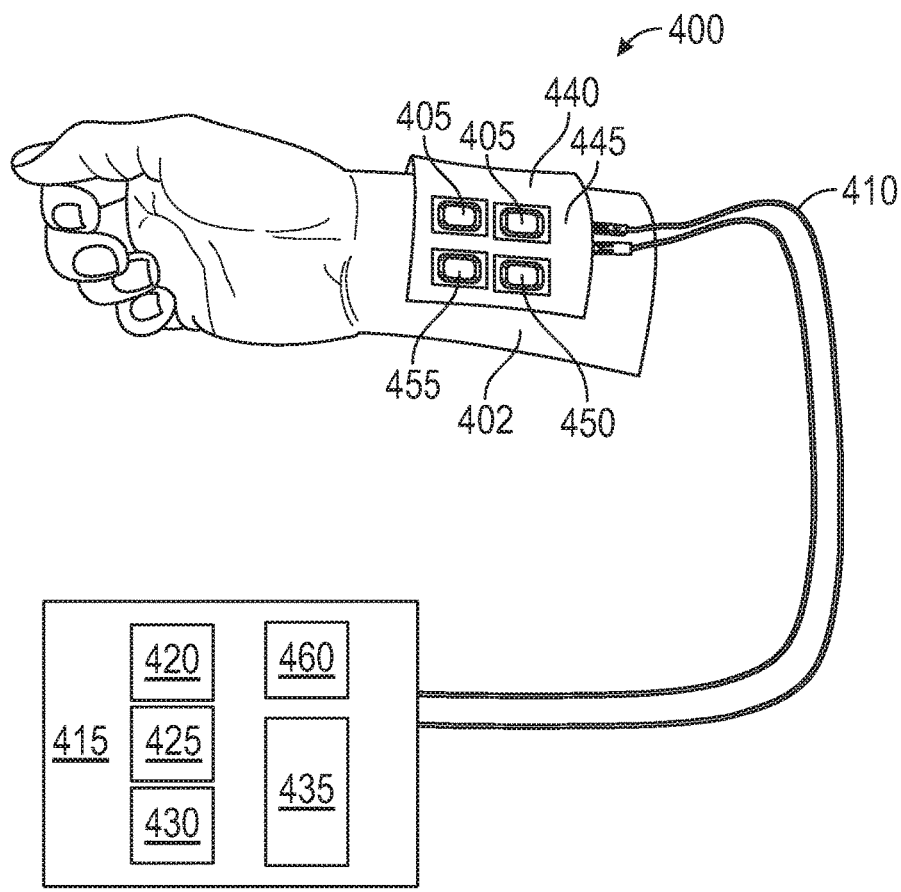
FIG. 4 depicts a block diagram of a system for simulating a pulse in accordance with the disclosed embodiments.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with controllers, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include, or have access to, a computing environment that includes input 116, output 118, and a communication connection 120. The computer may operate in a networked environment using a communication connection 120 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 can be a network of computers or other such devices, such as mobile phones, smartphones, sensors, controllers, speakers, tactile devices, and the like, in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more devices 204, servers 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 206, one or more external devices such as device 204, and a memory storage unit such as, for example, memory or database 208. It should be understood that device 204 may be embodied as a detector device, controller, receiver, transmitter, transceiver, transducer, RFID enabled speaker or other such device.

In the depicted example, device 204, server 206, and clients 210, 212, and 214 connect to network 202 along with storage unit 208. Clients 210, 212, and 214 may be, for example, personal computers or network computers, handheld devices, mobile devices, tablet devices, smartphones, personal digital assistants, printing devices, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet, with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smartphones, tablet devices multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the term "module" or "node" as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

In an embodiment, a pulse simulation device 400 comprises one or more tactile pulse simulators 402. The tactile pulse simulators 402 can further comprise one or more tactile devices 405 which can include speakers, moving elements, haptic motors, noncontact haptic devices, or piezoelectric elements that can be driven to model a human (or animal) pulse on a live human (or animal) actor, or on a mannequin, for the purpose of medical or veterinary simulation. The pulse simulators 402 can be connected via wired 410 or wireless connection to a controller 415. In the case of wireless connection, the pulse simulators 402 and controller 415 can include pulse simulator transmitter/receivers (transceivers) 455 and controller transmitter/receivers (transceivers) 450, respectively, to facilitate communication between the devices wirelessly.

A variety of speakers may be used as tactile devices 405. For example, in an embodiment, the speakers 405 can comprise micro speakers commonly used in cellular telephones. Micro speakers are generally comprised of a magnet and a voice coil that is attached to a diaphragm. The magnet and coil arrangement moves the diaphragm to push air (and thereby produce sound waves). The speaker can be in a shell or box that provides back volume space necessary for the production of sound waves.

Micro speakers are convenient because they are relatively inexpensive. However, the speakers 405, as used in the present disclosure, are not intended to provide an auditory output (although in certain embodiments the speakers can produce sounds). Instead, the movement of the diaphragm provides a tactile response that simulates a patient pulse and can be detected by a medical or veterinary trainee.

Accordingly, in other embodiments, other devices may be used to create the desired tactile response. In certain embodiments, moving devices such as actuators, haptic motors (i.e., haptic feedback motors), noncontact haptic devices, hydraulic devices, piezoelectric devices, and air pressure devices can be used to recreate the feeling of a pulse. Such devices may similarly be controlled by the controller, but may require separate control instructions hardwired on, or otherwise programmed in, the controller to properly function. The general functions of these devices, however, are all basically the same; that is the pulse signal from the controller creates movement in the device that mimics a pulse.

For example, the tactile devices 405 may be embodied as piezoelectric elements. The piezoelectric effect is a phenomenon resulting from the interaction between mechanical and electrical states in the crystalline structure of select materials. In general, when a piezoelectric material is exposed to an electric field, the material experiences a mechanical force (i.e., strain). Likewise, when the material experiences strain it will generate an electric field. Piezoelectric materials include Quartz, Topaz, Lead titanate, some other salts, and some sugars. Piezoelectric materials can also be synthetically created. One such synthetically created piezoelectric material is Kynar™ (i.e., Pennwalt Kynar™ piezoelectric film).

In certain embodiments, the piezoelectric elements can be piezoelectric speakers, piezoelectric motors, or other such piezoelectric actuators. In these devices, voltage supplied from the controller, with a specific wave form and in a specific pattern, can be converted into mechanical movement of a diaphragm via the piezoelectric effect, in a manner that emulates a patient's pulse.

In other embodiments, the tactile devices 405 can be embodied as haptic motors. Haptic motors can function in a number of ways. In some embodiments, the haptic motor can be embodied as an eccentric rotating mass motor. Eccentric rotating mass motors employ a motor to spin a mass attached to the motor by a shaft. As the mass rotates at high RPM, the resulting centrifugal force is experienced as a vibration that can be perceived by a user in contact with the haptic motor. In other embodiments, the haptic motor can be embodied as a linear resonant actuator. Linear resonant actuators use a magnetic mass attached to a spring that is driven up and down by an alternating current provided through an associated coil. The movement of the mass provides a haptic vibration. Other such haptic motors may similarly be used.

The haptic motors disclosed in this application differ from haptic motors used in other applications for other purposes. In particular, in some applications, haptic motors and non-contact haptic devices (i.e., air vortex, ultrasound, and ultrahaptics) provide sensory feedback to the person engaged with the equipment (for example, haptic motors in video game controllers). Haptic feedback in the game environment provides tactile, tactual (cutaneous and/or kinesthetic), or haptic feedback to a game player (i.e., "gamer") in the form of forces, vibrations, or motion. "Haptic" is generally used to mean touch intended to actively communicate or to actively sense or recognize. Haptic feedback can be provided via "suits," "vests," "gloves," "chairs," "joysticks," and the like, worn by or in physical contact with the gamer. However, an important difference in the embodiments disclosed herein is that the haptic motors are configured such that the pulse sensation is experienced not by the person wearing the device (i.e., the actor) but rather by the trainee who is not otherwise connected to the device. As such, the haptic motors disclosed herein can provide haptic feedback to a learner, not to the actor to whom it is attached.

The controller 415 can comprise a microcontroller such as an Arduino controller, or other such controller or microcontroller, with a connected power supply 420. The controller 415 may also be connected to, or otherwise be embodied as, a computer system such as computer system 100. The controller 415 can further be connected to a display device 425 such as an LCD display of a GUI associated with a computer system. The controller 415 can include a signal generating module which can comprise a signal generator, a transducer, a processor, or the like. The controller 415 can be configured to execute instructions embodied as non-transitory instruction media.

In an exemplary embodiment, an inexpensive microprocessor board can be used to control the tactile device 405 (e.g., a speaker) array in a very specific way. For example, the controller 415 can be configured to use voltage from the power supply to create a bi-polar square wave at 5 volts. Other voltages are possible in other embodiments. The bi-polar signal drives movement of the speaker array 405 to provide a simulated pulse. In certain embodiments, the characteristics of the simulated pulse can mirror those of a radial, brachial, dorsalis pedis, posterior tibial, or carotid pulse, respectively. It should be understood that these represent a selection of exemplary characteristics of a pulse from various anatomical locations. In other embodiments, the simulated pulse could further simulate the character of a pulse at other locations on a person or animal.

The controller 415 can synthesize a waveform at a rate ranging of 0 to 300 "beats" per minute. This waveform can be perceived (e.g., by a medical or veterinary trainee) as a pulse, by providing a tactile stimulus via the speaker array that is observed as pulsatile. The controller 415 (and/or computer system) can be configured to provide a signal comprising a square wave, a bipolar wave, a wave that mimics the pressure profile of a human or animal pulse, or a complex arbitrary wave that is perceived as a pulse by a trainee.

Figure 5:
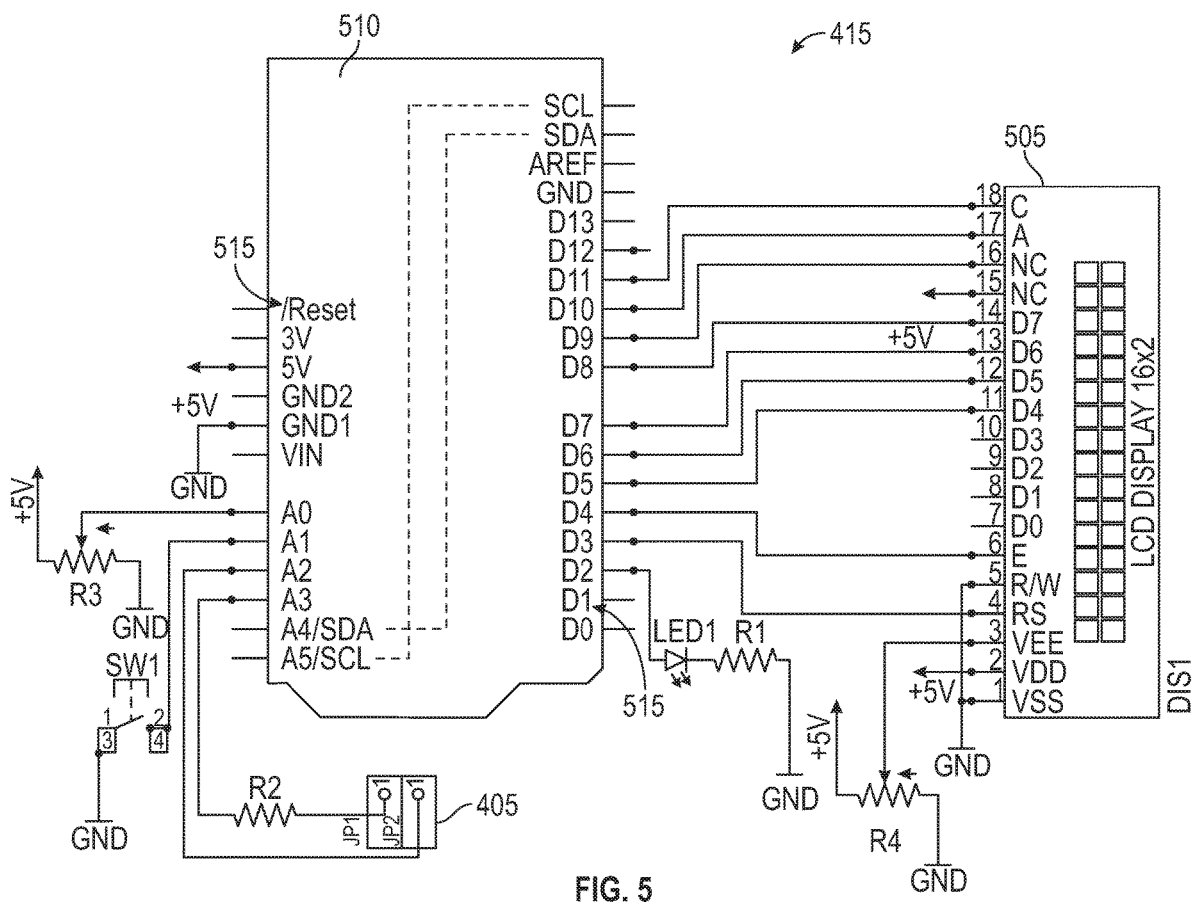
FIG. 5 depicts a circuit diagram of a system for simulating a pulse in accordance with the disclosed embodiments.

FIG. 5 illustrates an exemplary diagram of a controller 415 connected to a tactile device 405. As shown in FIG. 5, the controller 415 can comprise a board 510 with a programmable microprocessor that can be connected to a series of external devices, such as tactile device 405, via input and output ports 515 (e.g., pins) formed on the board 510. The microprocessor can receive input from, and send instructions to, external devices, according to instructions provided to the microprocessor. The controller 415 can be connected to an LCD display 505.

In other embodiments, a digital to analog converter may also be used to convert a digital signal into an analog signal before it is provided to the tactile device 405. The digital to analog converter can be used to control the amplitude of the signal and, by extension, the strength of the haptic response in the tactile device pulse along with pulse rhythm and timing. In some cases, pulse strength may be as important as pulse rhythm/timing in diagnosis. The digital to analog converter can be embodied as hardware on the microprocessor board or may be an external component.

The pulse simulation device 400 is configured to primarily provide the synthetic pulse as a haptic, touch, finger sensation, or palpation simulation. The device can include physical filtering or synthesis modules that modify the signal to attenuate signal frequencies that would result in the production of sound in the human hearing range (approximately 20 Hz to 20000 Hz). This can be achieved using electronic or mechanical filtering. For example, a passive low pass filter can be configured using a microfarad capacitor to create a short across the signal. In practice, the base signal (e.g., a bi-polar square wave) is generated. The low pass filter can be configured to short out desired frequencies in the signal to accentuate the haptic response and reduce the audible response of the tactile devices.

Alternatively, an active low pass filter composed of operational amplifiers (op amps) may be used to attenuate audible frequencies. Thus, while the device may provide a sound, it's primarily intended to provide haptic feedback. In other words, the device mimics the "feel" of a pulse, as sensed by a physician or veterinarian, during physical examination.

An important aspect of the disclosed embodiments is that the system can be reconfigured or preprogrammed to simulate a wide variety of pulse patterns that correlate with specific medical conditions. This may require facilitating a complex change of rhythm or timing of the tactile feedback provided by the tactile feedback devices 405. The synthetic pulse can be regular or irregular. An irregular pulse can be created by applying a pseudorandom time between beats. The controller can include a potentiometer 430, to vary pulse rate, and one or more switches 435 to toggle between regular and irregular rhythms and/or rates. The potentiometer and switches can be implemented in either hardware or software.

The tactile pulse simulator 402 can further include a housing 440 that can be attached to a medical actor (or pet) via a connection device 445. The connection device 445 can be embodied as a bracelet, anklet, or necklace. The connection device 445 can also be embodied as a cloth, foam, plastic, or leather swatch that can be fastened to various parts of a medical actor or pet. On a medical actor, this will most commonly be one or both wrists, one or both ankles, one or both feet, at the left and/or right groin, and on the left and/or right neck. The connection device 445 may be configured to match the texture of normal human skin or animal fur. The housing 440 can also be attached to the actor or pet with moulage to further disguise the equipment and add realism to the training exercise. In other embodiments, the housing 440 and/or the tactile pulse simulator 402 can be affixed directly to the actor or pet with double sided tape, stick'em, glue, or other such adhesive substance.

It should be appreciated that in certain embodiments, the connection between the controller 415 and the tactile device 405 may be wireless. In such cases, the housing may be further configured to include an on-board power source 460 (e.g., a battery) for driving the tactile device array.

In operation, the pulse simulation device 400 can preferably be applied over the actual pulse of an actor, to mask the actor's actual pulse, during a medical or veterinary simulation scenario. A pulse reduction pad can be included on the pulse simulation device 400 to dampen the actor's actual pulse. The pulse simulation device reproduces the sensation of a human or animal pulse as sensed by a human trainee, by generating a signal that drives the tactile device in a manner that simulates the pulse associated with a patient with a specific medical condition.

The feel of a pulse at a patient's wrist may vary from the feel of a patient's pulse at other locations on their body (e.g., their ankle, wrist, chest, or neck). These variations include differences in pulse intensity and/or amplitude, as well as delays in timing of the arrival of the simulated pulse. As such, the controller can provide a signal that drives the tactile device to correctly emulate the pulse feel at various points on the actor's body.

Figure 6:
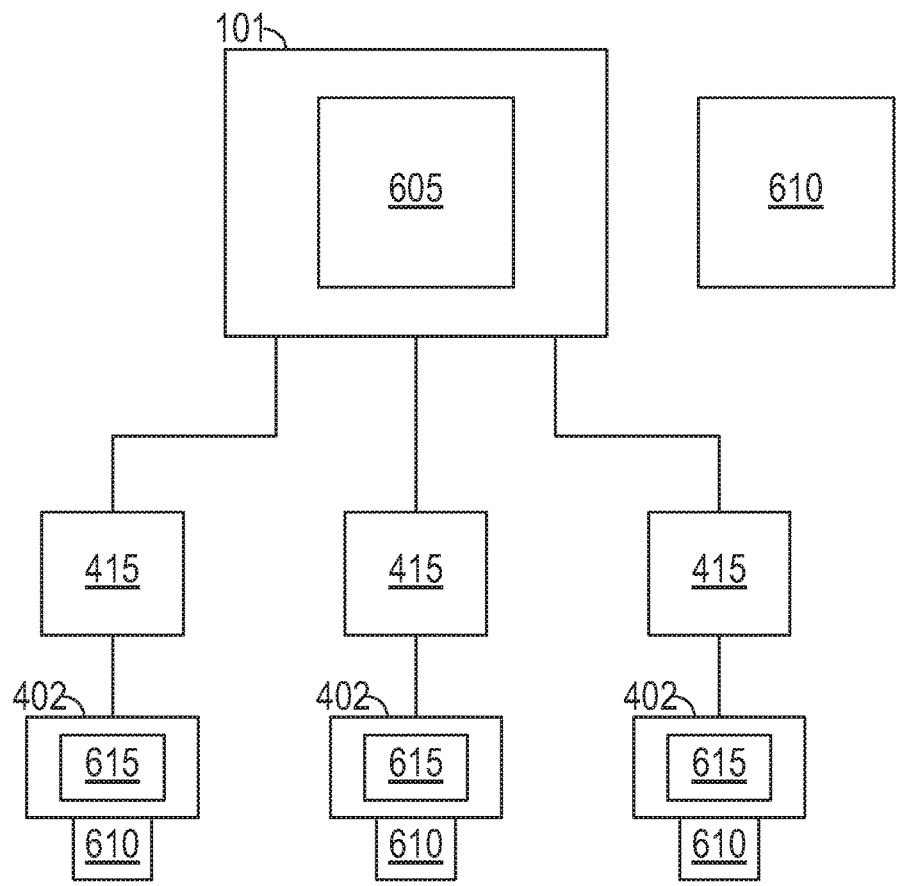
FIG. 6 depicts a block diagram of a system for simulating a pulse in accordance with disclosed embodiments.

In an extension of the embodiments, illustrated in FIG. 6, a plurality of tactile pulse simulator devices 402 can be disposed in various locations on the actor's body. Each of the tactile pulse simulator devices 402 can be controlled by individual controllers 415, which are, in turn, controlled by a single master control 605. The master control 605 can be configured to ensure that the pulse at the various body locations correctly emulates the pulse experienced by a patient with a specific medical condition, even where the pulse for that medical condition may differ at different locations on the body. The controller may further be configured to provide emulations of multiple conditions.

The master control 605 can be embodied as non-transitory instruction media executed by a computer system 101. The instruction media can further provide a GUI that allows a user to select a given medical condition along with various controls including those that start and stop the pulse simulation. The computer system can include a database that has a list of medical conditions and the associated pulse characteristics for the medical conditions. The database can further include data describing the synchronization of the pulse characteristics at given body locations. The master control can thus instruct the various controllers 415 to produce pulse signals according to the selected medical condition with the correct pulse characteristics for the specific body locations. It should be appreciated that alternatively, the master control 605 can be a controller 415 with additional on-board instructions and data structures sufficient to control one or more tactile pulse simulators 402.

In an embodiment, each of the tactile pulse simulator devices 402 can include an RFID tag 615 indicating their respective body location. This may be, for example, right wrist, left wrist, right ankle, left ankle, left foot, right foot, left groin, right groin, left neck, right neck, etc. The pulse simulator devices can similarly be labeled with a human readable label indicating their body location so that a user knows where to attach each device. The database associated with the given medical conditions can further include (or be provided) an RFID location associated with each pulse simulator device. When the pulse simulator devices are deployed on an actor, an RFID scanner 610 can scan each device that is in use and transmit that information to the database so that the master control knows which pulse simulator devices to activate.

For example, in some scenarios it may only be necessary to deploy pulse simulator devices on the right wrist of an actor. In such cases, only the "right wrist" pulse simulator can be activated by the master controller after it is scanned by the RFID scanner. In other cases, it may be necessary to deploy pulse simulator devices on a left neck, left ankle, and right wrist of an actor. In that case, all the "left neck," "left ankle," and "right wrist" pulse simulator devices can be activated.

In an embodiment, the device can simulate a pulse at anatomical regions used for arterial pulse palpation. In a human, this commonly would be the following pulse sites: carotid (left and right neck), radial (left and right wrist), brachial (left and right arm), femoral (left and right groin), posterior tibial (left and right ankle), and *dorsalis* pedis (left and right foot) arterial pulses. Other sites also may be used in humans, and other sites may be more common in non-human animals.

In addition, the device can simulate a pulse during medical treatment scenarios such as stopping supraventricular tachycardia with adenosine or vagal maneuvers (modeled by a rapid pulse that briefly stops after adenosine, followed by an increasing pulse to a normal sinus rhythm), treatment of ventricular tachycardia with electrical defibrillation (a very rapid pulse followed by a brief pause as defibrillation occurs followed by return to a normal sinus rhythm), treatment of a supraventricular tachycardia with a pulse by synchronized electrical cardioversion (rapid pulse that briefly stops after cardioversion followed by an increasing pulse to a normal sinus rhythm), control of atrial fibrillation with rapid ventricular rate with beta-blockers or calcium channel blockers (rapid irregular pulse that smoothly declines to a rate of 50-100 beats per minute (i.e., NSR) over a period of minutes or hours, that can be regular or irregular), application of a tourniquet (abrupt cessation of a pulse after appropriate application of a tourniquet), as well as other emergency cardiac or vascular interventions.

In another embodiment, the device can include multiple independent devices at various anatomical sites, which may independently vary in intensity (amplitude) and time delay to mimic disease states such as aortic dissection (different pulse amplitudes at various sites depending on the location of dissection), pulsus parvus et tardus (a pulse that is small with slow rising delayed amplitude, characteristic of aortic valve stenosis), pulsus paradoxus (an abnormally large decrease in pulse amplitude on inspiration, characteristic of COPD, asthma, cardiac tamponade, pericarditis, sleep apnea, and croup), pulsus alternans (alternating strong and weak pulse beats, characteristic of left ventricular dysfunction), pulsus bigeminus (a strong beat then a weak beat followed by a longer pause, characteristic of hypertrophic obstructive cardiomyopathy and other conditions), pulsus bisferiens (a double peak pulse, characteristic of aortic valve insufficiency, aortic valve insufficiency with aortic valve stenosis, and hypertrophic obstructive cardiomyopathy), and other medical conditions.

Figure 7:
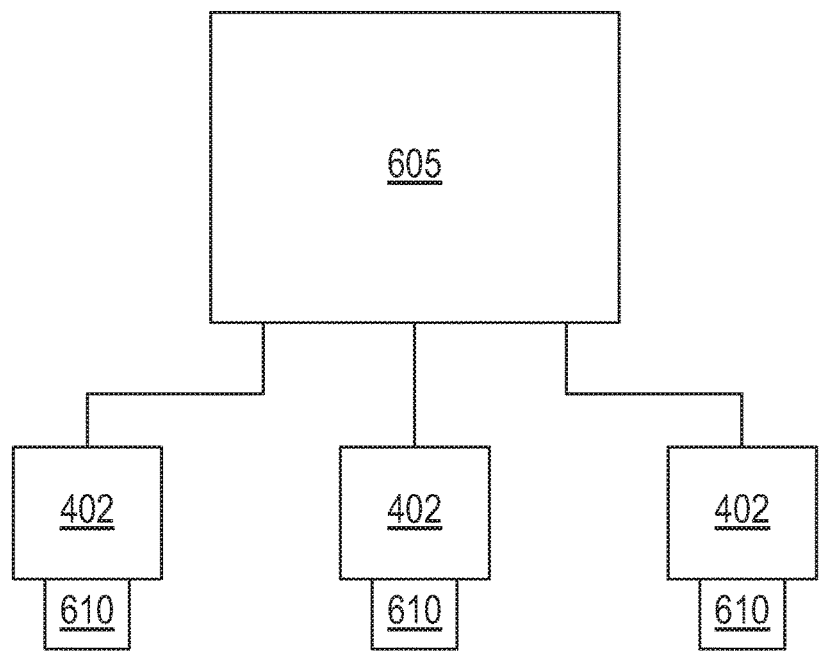
FIG. 7 depicts a block diagram of an alternative system architecture for simulating a pulse in accordance with the disclosed embodiments.

FIG. 7 illustrates an alternative embodiment wherein the master control 605 directly controls multiple pulse simulator devices 402. In this embodiment, the pulse simulator devices 402 are provided signals from the master control 605. In some embodiments, the pulse simulator devices 402 may thus be equipped with a microprocessor and associated hardware necessary to generate and modify signals that are then sent to the tactile devices.

It should be appreciated that the embodiments disclosed herein may be directly wired, wireless, or remotely controlled. The device 402 can also be computer controlled, with one or multiple computer processors, with associated internet access/control, and memory assets (i.e., disk drive, CD drive, flash drive, etc.). The device can be programmed or re-programmed to produce various pulses and medical scenarios during simulation.

In certain embodiments, the device can be synchronized with other vital signs or signals, for example: blood pressure, pulse oximetry, EKG, CO2 detection, and others. In such embodiments, the vital signs or signals can be pre-recorded, or may be synthesized directly by the controller. These vital signs or signals can be different as measured in various body locations. For example, the blood pressure measured in the arms may be much greater than in the legs while simulating abdominal aortic dissection. This synchronization may be initiated by the device described herein or may be controlled by other vital signs. In other embodiments, the other vital signs may be selected by a user (e.g., at a GUI) such that the master controller can then synchronize the simulated pulse to the user-selected vital signs.

Figure 8:
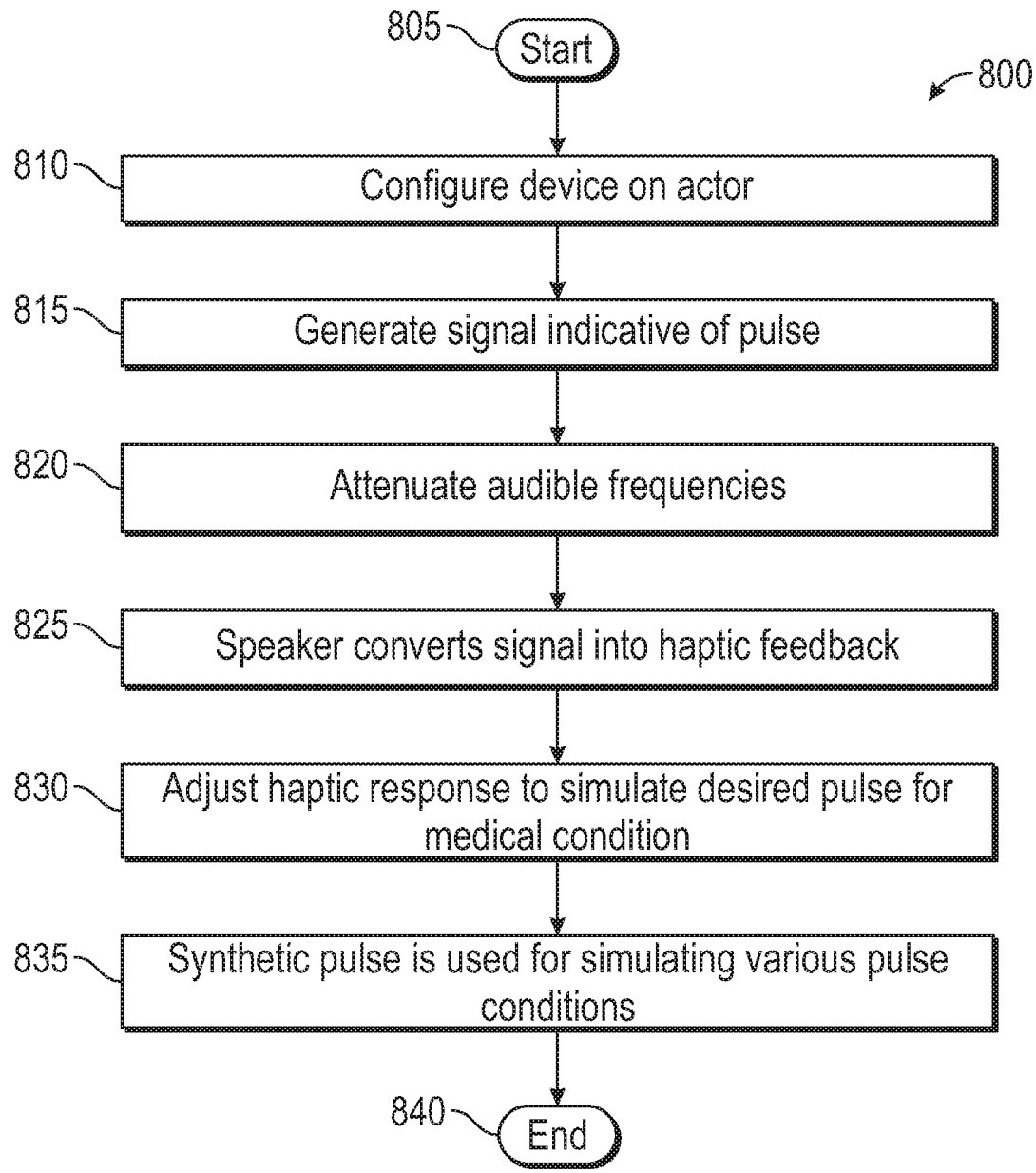
FIG. 8 depicts a flow chart of steps associated with a method for simulating a pulse in accordance with the disclosed embodiments.

FIG. 8 illustrates a flow chart of steps associated with a method 800 for simulating a pulse. The method begins at step 805.

First, the device can be attached to an actor or animal as shown at step 810. The attachment may be at a specific location such as a wrist, ankle, foot, or neck of the actor according to the malady the actor will be simulating. The device can further be attached in a manner that covers or otherwise suppresses the actor's real pulse. The device can be disguised with moulage or fur to add to the realism of the training exercise.

Next, a signal can be generated with a specified frequency and strength, as shown at step 815, to emulate the pulse pattern. The signal can be a 5-volt bi-polar square wave, but other signals may also be used. The signal is next modified to remove those frequencies that would result in an audible output as illustrated at step 820. This may be achieved with a capacitor (and the resistance of the tactile devices) to create a passive low pass filter for such frequencies.

The signal is provided to tactile devices, which convert the signal into movement of the tactile devices at step 825 in a pattern that emulates a pulse. The simulated pulse can be detected by a trainee. The haptic response can be adjusted at step 830 to simulate the desired pulse characteristics at a specific location on the body. The synthetic pulse is thus used to simulate a pulse condition as shown at step 835 so that the interaction between the actor (or animal) and trainee is more realistic. The method ends at step 840.

Based on the foregoing, it can be appreciated that a number of embodiments, preferred and alternative, are disclosed herein. For example, in one embodiment a pulse simulation device comprises a controller for generating at least one signal simulating a pulse; at least one tactile feedback unit wherein the at least one tactile feedback unit is driven by the controller to generate tactile response simulating a pulse; and a wearable attachment for holding the at least one tactile feedback on an actor.

In an embodiment, the signal simulating a pulse further comprises: a square wave, a bipolar wave, a wave that mimics a pressure profile of a human pulse, a wave that mimics a pressure profile of an animal pulse, and a complex arbitrary wave.

In another embodiment, the wearable attachment further comprises a pulse attenuating pad, wherein the pulse attenuating pad attenuates the tactile response of the actor's actual pulse above the pulse attenuating pad thereby masking the actors actual pulse. In an embodiment, the actor comprises: a live human actor, a live animal actor, a human mannequin, and/or an animal mannequin.

In an embodiment, the pulse simulation device further comprises a filter for attenuating audible signals that drive the tactile feedback unit as a haptic device, not as a sound, audible, or auscultation device. In an embodiment, the filter comprises an active or passive low pass filter.

In an embodiment, the controller further comprises a signal generation module configured to generate at least one signal simulating a pulse at a plurality of locations on the actor's body and a module for selecting at least one of the signals simulating a pulse at least one of the plurality of locations on the actor's body.

In another embodiment, the controller further comprises a signal generation module configured to generate at least one signal simulating a pulse indicative of a plurality of medical conditions and a module for selecting at least one of the signals simulating a pulse indicative of at least one of the plurality of medical conditions.

In yet another embodiment, the controller further comprises a signal generation module configured to generate at least one or more signals simulating a pulse with variable time delay and variable amplitude (intensity) and a module that provides independent time delay and amplitude characteristics at a multitude of pulse locations on an actor's body.

And in another embodiment, the controller further comprises a module that synchronizes vital signs, actions, and learner feedback with the pulse.

In an embodiment, a method for simulating a pulse comprises generating at least one signal simulating a pulse with a controller, generating a tactile response with at least one tactile feedback unit wherein the at least one tactile feedback unit is driven by the controller, and connecting the at least one tactile feedback unit on an actor with a wearable attachment. In an embodiment, generating at least one signal further comprises generating at least one of: a square wave, a bipolar wave, a wave that mimics a pressure profile of a human pulse, a wave that mimics a pressure profile of an animal pulse, and a complex arbitrary wave.

In an embodiment, the method further comprises attenuating the signals that drive the tactile feedback unit with a filter, the filter comprising a low pass filter.

In an embodiment, generating at least one signal simulating a pulse further comprises at least one of: generating at least one signal simulating a pulse at a plurality of locations on the actor's body, generating at least one signal simulating a pulse indicative of a plurality of medical conditions, generating at least one signal simulating a pulse with variable time delay and variable amplitude the variable time delay and the variable amplitude being provided at one or more locations on the actor's body.

In another embodiment, generating at least one signal simulating a pulse further comprises selecting at least one of the signals simulating a pulse indicative of at least one of the plurality of locations on the actor's body, the plurality of medical conditions, and the variable time delay and variable amplitude.

In yet another embodiment, the method comprises synchronizing at least one of vital signs, actions, and learner feedback with the signal simulating a pulse.

In another embodiment, a system for simulating a pulse, the system comprises a controller for generating at least one signal simulating a pulse, the controller being further configured to synchronize at least one of vital signs, actions, and learner feedback with the signal simulating a pulse, a filter comprising low pass filter for modifying the signal simulating the pulse, at least one tactile feedback unit wherein the at least one tactile feedback unit is driven by the controller to generate tactile response simulating a pulse, and a wearable attachment for holding the at least one tactile feedback on an actor, the actor comprising at least one of a live human actor, a live animal actor, a human mannequin, and an animal mannequin, the wearable attachment further comprising a pulse attenuating pad.

In an embodiment, simulating a pulse further comprises generating a square wave, a bipolar wave, a wave that mimics a pressure profile of a human pulse, a wave that mimics a pressure profile of an animal pulse, and a complex arbitrary wave.

In another embodiment, a controller further comprises a signal generation module, the signal generation module configured to generate at least one of a signal simulating a pulse at a plurality of locations on the actor's body, a signal simulating a pulse indicative of a plurality of medical conditions, and a signal simulating a pulse with variable time delay and variable amplitude, the variable time delay and the variable amplitude being provided at one or more locations on the actor's body.

It will be appreciated that variations of the above-disclosed and other features and functions, or alternatives thereof, may be desirably combined into many other different systems or applications. Also, it should be understood that various presently unforeseen or unanticipated alternatives, modifications, variations or improvements therein may be subsequently made by those skilled in the art which are also intended to be encompassed by the following claims.

What is claimed is:

1. A pulse simulation device comprising:
a plurality of electrically driven tactile feedback units for distribution on a plurality of locations on an actor to generate tactile response simulating a pulse, each of said plurality of electrically driven tactile feedback units comprising at least one of a haptic motor, a noncontact haptic device, and/or a piezoelectric element;
a controller for generating at least one electric signal simulating a pulse wherein said controller further comprises a signal generation module configured to generate a plurality of signals simulating a pulse to drive each of said plurality of electrically driven tactile feedback units wherein said plurality of signals are separated by a length of time, said length of time being dependent on said plurality of locations on said actor, where said plurality of electrically driven tactile feedback units are distributed, and a simulated medical condition; and
a wearable attachment for holding each of said plurality of electrically driven tactile feedback units on said actor.

2. The pulse simulation device of claim 1 wherein said at least one electric signal simulating a pulse further comprises at least one of:
a square wave;
a bipolar wave;
a wave that mimics a pressure profile of a human pulse;
a wave that mimics a pressure profile of an animal pulse; and/or
a complex arbitrary wave.

3. The pulse simulation device of claim 1 wherein said wearable attachment further comprises:
a connection device;
a housing connected to the connection device; and
a pulse attenuating pad associated with the housing, wherein said pulse attenuating pad attenuates the tactile response of said actor's actual pulse above said pulse attenuating pad thereby masking said actor's actual pulse.

4. The pulse simulation device of claim 1 wherein said actor comprises at least one of:
a live human actor;
a live animal actor;
a human mannequin; and/or
an animal mannequin.

5. The pulse simulation device of claim 1 further comprising:
a filter for attenuating said at least one electric signal that drives said plurality of electrically driven tactile feedback units.

6. The pulse simulation device of claim 5 wherein said filter comprises a low pass filter.

7. The pulse simulation device of claim 1 wherein said controller further comprises:
a module for selecting at least one of said electric signals simulating a pulse to drive each of said plurality of electrically driven tactile feedback units.

8. The pulse simulation device of claim 1 wherein said signal generation module is configured to generate said at least one electric signal simulating a pulse with variable time delay and variable amplitude, said variable time delay and said variable amplitude being provided at said plurality of locations on said actor.

9. The pulse simulation device of claim 1 wherein said controller is configured to synchronize at least one of vital signs, actions, and learner feedback with said at least one electric signal simulating a pulse.

10. A method for simulating a pulse comprising:
generating at least one electric signal simulating a pulse with a controller;
generating a tactile response with an electrically driven tactile feedback unit wherein said electrically driven tactile feedback unit is driven by said controller;
selecting at least one of said electric signals simulating a pulse to drive said electrically driven tactile feedback unit according to a location of said electrically driven tactile feedback unit on an actor, one of a plurality of medical conditions, and a variable time delay and variable amplitude; and
providing a wearable attachment for connecting said electrically driven tactile feedback unit on said actor.

11. The method of claim 10 wherein generating at least one signal further comprises generating at least one of:
a square wave;
a bipolar wave;
a wave that mimics a pressure profile of a human pulse;
a wave that mimics a pressure profile of an animal pulse; and/or
a complex arbitrary wave.

12. The method of claim 10 further comprising:
attenuating said at least one electric signal that drives said electrically driven tactile feedback unit with a low pass filter to reduce sound emitted by said electrically driven tactile feedback unit.

13. The method of claim 10 wherein generating at least one electric signal simulating a pulse further comprises at least one of:
generating said at least one electric signal simulating a pulse to drive a plurality of said electrically driven tactile feedback units distributed at a plurality of locations on said actor;
generating said at least one electric signal simulating a pulse to drive said electrically driven tactile feedback unit to simulate a plurality of medical conditions; and
generating said at least one electric signal simulating a pulse with variable time delay and variable amplitude, said variable time delay and said variable amplitude being provided to a plurality of said electrically driven tactile feedback units distributed at a plurality of locations on said actor.

14. The method of claim 10 further comprising:
synchronizing at least one of vital signs, actions, and learner feedback, with said at least one electric signal simulating a pulse.

15. A system for simulating a pulse, said system comprising:
a controller for generating at least one electric signal simulating a pulse;
a filter comprising a low pass filter for modifying said at least one electric signal simulating said pulse;
at least one tactile feedback unit wherein said at least one tactile feedback unit is electrically driven by said controller to generate tactile response simulating a pulse wherein said controller is configured for selecting at least one of said electric signals simulating a pulse to drive said at least one electrically driven tactile feedback unit according to a location of said electrically driven tactile feedback unit on an actor, one of a plurality of medical conditions, and a variable time delay and variable amplitude; and
a wearable attachment for holding said at least one tactile feedback unit on an actor, said actor comprising at least one of a live human actor, a live animal actor, a human mannequin, and/or an animal mannequin, said wearable attachment further comprising a pulse attenuating pad.

16. The system for simulating a pulse of claim 15 wherein said at least one electric signal simulating a pulse further comprises at least one of:

a square wave;

a bipolar wave;

a wave that mimics a pressure profile of a human pulse;

a wave that mimics a pressure profile of an animal pulse; and/or a complex arbitrary wave.

17. The system for simulating a pulse of claim 15 wherein said controller further comprises a signal generation module said signal generation module configured to generate at least one of:

a signal simulating a pulse at a plurality of locations on said actor;

a signal simulating a pulse indicative of a plurality of medical conditions; and a signal simulating a pulse with variable time delay and variable amplitude, said variable time delay and said variable amplitude being provided at one or more locations on said actor's body.

* * * * *